(12) United States Patent
Zhao et al.

(10) Patent No.: US 10,776,415 B2
(45) Date of Patent: Sep. 15, 2020

(54) SYSTEM AND METHOD FOR VISUALIZING AND RECOMMENDING MEDIA CONTENT BASED ON SEQUENTIAL CONTEXT

(71) Applicant: FUJI XEROX CO., LTD., Tokyo (JP)

(72) Inventors: Jian Zhao, Cupertino, CA (US); Chidansh Amitkumar Bhatt, Moutain View, CA (US); Matthew L. Cooper, San Francisco, CA (US); David Ayman Shamma, San Francisco, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 226 days.

(21) Appl. No.: 15/920,758

(22) Filed: Mar. 14, 2018

(65) Prior Publication Data
US 2019/0286715 A1    Sep. 19, 2019

(51) Int. Cl.
| | |
|---|---|
| *G06F 7/00* | (2006.01) |
| *G06F 16/44* | (2019.01) |
| *G06T 11/20* | (2006.01) |
| *G06F 16/438* | (2019.01) |
| *H04N 21/8405* | (2011.01) |
| *H04N 21/45* | (2011.01) |
| *H04N 21/466* | (2011.01) |

(52) U.S. Cl.
CPC .......... *G06F 16/444* (2019.01); *G06F 16/438* (2019.01); *G06T 11/206* (2013.01); *H04N 21/4532* (2013.01); *H04N 21/4668* (2013.01); *H04N 21/8405* (2013.01)

(58) Field of Classification Search
CPC ...... G06F 16/44; G06F 16/7867; G06F 16/58; G06F 16/41; G06F 16/0536; G06F 16/248

USPC ...................... 707/722, 913, 708, 771, 104.1
See application file for complete search history.

(56) References Cited

U.S. PATENT DOCUMENTS

| | | | |
|---|---|---|---|
| 7,068,723 B2 * | 6/2006 | Foote ................... | G11B 27/031 375/240.25 |
| 7,079,142 B2 * | 7/2006 | Chiu ..................... | G06T 11/206 345/440 |
| 7,284,004 B2 * | 10/2007 | Cooper ................ | G10H 1/0008 |

(Continued)

OTHER PUBLICATIONS

Saijing Zheng, Mary Beth Rosson, Patrick C. Shih, and John M. Carroll. Understanding student motivation, behaviors and perceptions in moocs. In Proceedings of the ACM Conference on Computer Supported Cooperative Work and Social Computing, CSCW '15, pp. 1882-1895, 2015. (14 pages) (Mar. 2015).

(Continued)

*Primary Examiner* — Daniel A Kuddus
(74) *Attorney, Agent, or Firm* — Procopio, Cory, Hargreaves & Savitch LLP

(57) ABSTRACT

A method of visualizing recommended pieces of media content is provided. The method includes identifying at least one piece of media content associated with a received content feature associated with a viewed piece of media content, selecting at least one additional piece of media content linked to the viewed piece of media content by a sequential relationship, generating a two-dimensional visualization based on a content similarity between the identified at least one piece of media content, the viewed piece of media content, and the selected at least one additional piece of media content and the sequential relationship; and displaying the generated two-dimensional visualization.

20 Claims, 8 Drawing Sheets
(4 of 8 Drawing Sheet(s) Filed in Color)

(56) References Cited

U.S. PATENT DOCUMENTS

| | | | | |
|---|---|---|---|---|
| 8,010,536 | B2* | 8/2011 | Nemeth | G06F 16/48 707/748 |
| 8,543,454 | B2* | 9/2013 | Fleischman | G06Q 30/0201 705/14.44 |
| 8,762,890 | B2* | 6/2014 | Falchuk | G06F 3/04815 715/782 |
| 9,311,309 | B2* | 4/2016 | Faenger | G06F 16/4387 |
| 9,679,338 | B2* | 6/2017 | Magcale | G06F 3/0481 |
| 2004/0221237 | A1* | 11/2004 | Foote | G06K 9/00758 715/700 |
| 2005/0069225 | A1* | 3/2005 | Schneider | H04N 21/234318 382/305 |
| 2005/0071736 | A1* | 3/2005 | Schneider | G06F 16/48 715/201 |
| 2005/0151737 | A1* | 7/2005 | Chiu | G06T 11/206 345/440 |
| 2005/0249080 | A1* | 11/2005 | Foote | G11B 27/031 369/59.1 |
| 2009/0132520 | A1* | 5/2009 | Nemeth | G06F 16/48 |
| 2009/0313267 | A1* | 12/2009 | Girgensohn | G06F 16/44 |
| 2011/0035705 | A1* | 2/2011 | Faenger | G06F 16/4387 715/811 |
| 2012/0192115 | A1* | 7/2012 | Falchuk | G06F 3/04815 715/850 |
| 2013/0036345 | A1* | 2/2013 | Girgensohn | G06K 9/00442 715/205 |
| 2014/0306987 | A1* | 10/2014 | Snibbe | H04N 21/4668 345/619 |
| 2015/0147728 | A1* | 5/2015 | Hochenbaum | G09B 5/06 434/118 |
| 2018/0255290 | A1* | 9/2018 | Holzer | H04N 13/279 |
| 2019/0318003 | A1* | 10/2019 | Kennedy | G06F 16/345 |

OTHER PUBLICATIONS

Juho Kim, Philip J. Guo, Daniel T. Seaton, Piotr Mitros, Krzysztof Z. Gajos, and Robert C. Miller. Understanding in-video dropouts and interaction peaks inonline lecture videos. In Proceedings of the First ACM Conference on Learning @ Scale Conference, L@S '14, pp. 31-40, 2014. (11 pages).

Carleton Coffrin, Linda Corrin, Paula de Barba, and Gregor Kennedy. Visualizing patterns of student engagement and performance in moocs. In Proceedings of the Fourth International Conference on Learning Analytics And Knowledge, LAK '14, pp. 83-92, 2014. (10 pages).

KhanAcademy Knowledge Map. https://www.khanacademy.org/exercisedashboard, Accessed in Mar. 13, 2018. (2 pages).

M. Schwab, H. Strobelt, J. Tompkin, C. Fredericks, C. Huff, D. Higgins, A. Strezhnev, M. Komisarchik, G. King, and H. Pfister. booc.io: An education system with hierarchical concept maps and dynamic non-linear learning plans. IEEE Transactions on Visualization and Computer Graphics, 23(1):571-580, Jan. 2017. (10 pages).

Philippe Fournier-Viger, Antonio Gomariz, Ted Gueniche, Esp'erance Mwamikazi, and Rincy Thomas. TKS: Efficient Mining of Top-K Sequential Patterns, pp. 109-120. 2013. (12 pages).

E. Gomez-Nieto, F. S. Roman, P. Pagliosa, W. Casaca, E. S. Helou, M. C. F. de Oliveira, and L. G. Nonato. Similarity preserving snippet-based visualization of web search results. IEEE Transactions on Visualization and Computer Graphics, 20(3):457-470, Mar. 2014. (14 pages).

Stuart Rose, Dave Engel, Nick Cramer, and Wendy Cowley. Automatic keyword extraction from individual documents. Text Mining: Applications and Theory, pp. 1-20, 2010. (18 pages).

Marian Dork, Nathalie Henry Riche, Gonzalo Ramos, and Susan Dumais. Pivotpaths: Strolling through faceted information spaces. IEEE Transactions on Visualization and Computer Graphics, 18(12):2709-2718, Dec. 2012. (10 pages).

T. Nguyen and J. Zhang. A novel visualization model for web search results. IEEE Transactions on Visualization and Computer Graphics, 12(5):981-988, Sep. 2006. (8 pages).

Jaakko Peltonen, Kseniia Belorustceva, and Tuukka Ruotsalo. Topic-relevance map: Visualization for improving search result comprehension. In Proceedings of the 22nd International Conference on Intelligent User Interfaces, IUI '17, pp. 611-622, 2017. (12 pages).

James A. Wise. The ecological approach to text visualization. Journal of the American Society for Information Science, 50(13):1224-1233, 1999. (10 pages).

M. Kim, K. Kang, D. Park, J. Choo, and N. Elmqvist. Topiclens: Efficient multi-level visual topic exploration of large-scale document collections. IEEE Transactions on Visualization and Computer Graphics, 23(1):151-160, Jan. 2017. (10 pages).

Franck Dernoncourt, Colin Taylor, Una-May O'Reilly, Kayan Veeramachaneni, Sherwin Wu, Chuong Do, and Sherif Halawa. Moocviz: A large scale, open access, collaborative, data analytics platform for moocs. In Proceedings of NIPS Workshop on Data-Driven Education, 2013. (8 pages).

Conglei Shi, Siwei Fu, Qing Chen, and Huamin Qu. Vismooc: Visualizing video clickstream data from massive open online courses. In Proceedings of IEEE Pacific Visualization Symposium (PacificVis), pp. 159-166, Apr. 2015. ( 8 pages).

S. Fu, J. Zhao, W. Cui, and H. Qu. Visual analysis of mooc forums with iforum. IEEE Transactions on Visualization and Computer Graphics, 23(1):201-210, Jan. 2017. (10 pages).

* cited by examiner

SYSTEM AND METHOD FOR VISUALIZING AND RECOMMENDING MEDIA CONTENT BASED ON SEQUENTIAL CONTEXT

BACKGROUND

Field

The present disclosure relates to content media viewing systems, and more specifically, to system and method for visualizing and recommending media content based on sequential context.

Related Art

In some related art, data recommendation is an increasingly critical research problem due to information over-load. In some cases, a key to easing users who may be overwhelmed by the amount of data available to them is the use of context within recommendation. In the related art, one source of context in domains such as training or education has been using sequential relationships among the concepts users aim to understand.

For example, in some related art techniques, modem online education platforms may allow for teaching at a distance by presenting educational materials as Massive Open Online Courses (MOOC). A MOOC usually consists of a number of short videos, each targeting a specific concept. To achieve certain learning objectives, instructors may commonly order the videos according to a syllabus which may also group videos hierarchically into sections. However, related art studies have shown that professionals, who comprise an increasing portion of MOOC learners, aim to advance their career growth (rather than obtaining a certification), and are less likely to follow the syllabus. In this related art, it may be important to offer these learners more flexible access to a broader range of content and perspectives (e.g., from multiple courses).

Some related art platforms may provide an interactive knowledge (concept) map or visualization that allows for more personalized learning behaviors. However, these concept maps may not be well suited for sequential flow and creating a dependency of concepts may require manual creation by instructors, which is neither scalable nor adaptive. Example implementations of the present application may address one or more of the problems with the related art.

SUMMARY OF THE DISCLOSURE

Aspects of the present application may relate to a method of visualizing recommended pieces of media content. The method may include identifying at least one piece of media content associated with a received content feature associated with a viewed piece of media content, selecting at least one additional piece of media content linked to the viewed piece of media content by a sequential relationship, generating a two-dimensional visualization based on a content similarity between the identified at least one piece of media content, the viewed piece of media content, and the selected at least one additional piece of media content and the sequential relationship; and displaying the generated two-dimensional visualization.

Additional aspects of the present application may relate to a non-transitory computer readable medium having stored therein a program for making a computer execute a method of visualizing recommended pieces of media content. The method may include identifying at least one piece of media content associated with a received content feature associated with a viewed piece of media content, selecting at least one additional piece of media content linked to the viewed piece of media content by a sequential relationship, generating a two-dimensional visualization based on a content similarity between the identified at least one piece of media content, the viewed piece of media content, and the selected at least one additional piece of media content and the sequential relationship; and displaying the generated two-dimensional visualization.

Further aspects of the present application relate to a computer apparatus configured to analyze a corpus comprising a plurality of pieces of content media. The computer apparatus may include a memory and a processor. The memory may store a plurality of pieces of content media; and a processor executing a process. The process may include identifying at least one piece of media content associated with a received content feature associated with a viewed piece of media content, selecting at least one additional piece of media content linked to the viewed piece of media content by a sequential relationship, generating a two-dimensional visualization based on a content similarity between the identified at least one piece of media content, the viewed piece of media content, and the selected at least one additional piece of media content and the sequential relationship, and displaying the generated two-dimensional visualization.

Still further aspects of the present application relate to a computer apparatus configured to analyze a corpus comprising a plurality of pieces of content media. The computer apparatus may include means for storing a plurality of pieces of content media; and a processor executing a process, means for identifying at least one piece of media content associated with a received content feature associated with a viewed piece of media content, means for selecting at least one additional piece of media content linked to the viewed piece of media content by a sequential relationship, means for generating a two-dimensional visualization based on a content similarity between the identified at least one piece of media content, the viewed piece of media content, and the selected at least one additional piece of media content and the sequential relationship, and means for displaying the generated two-dimensional visualization.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
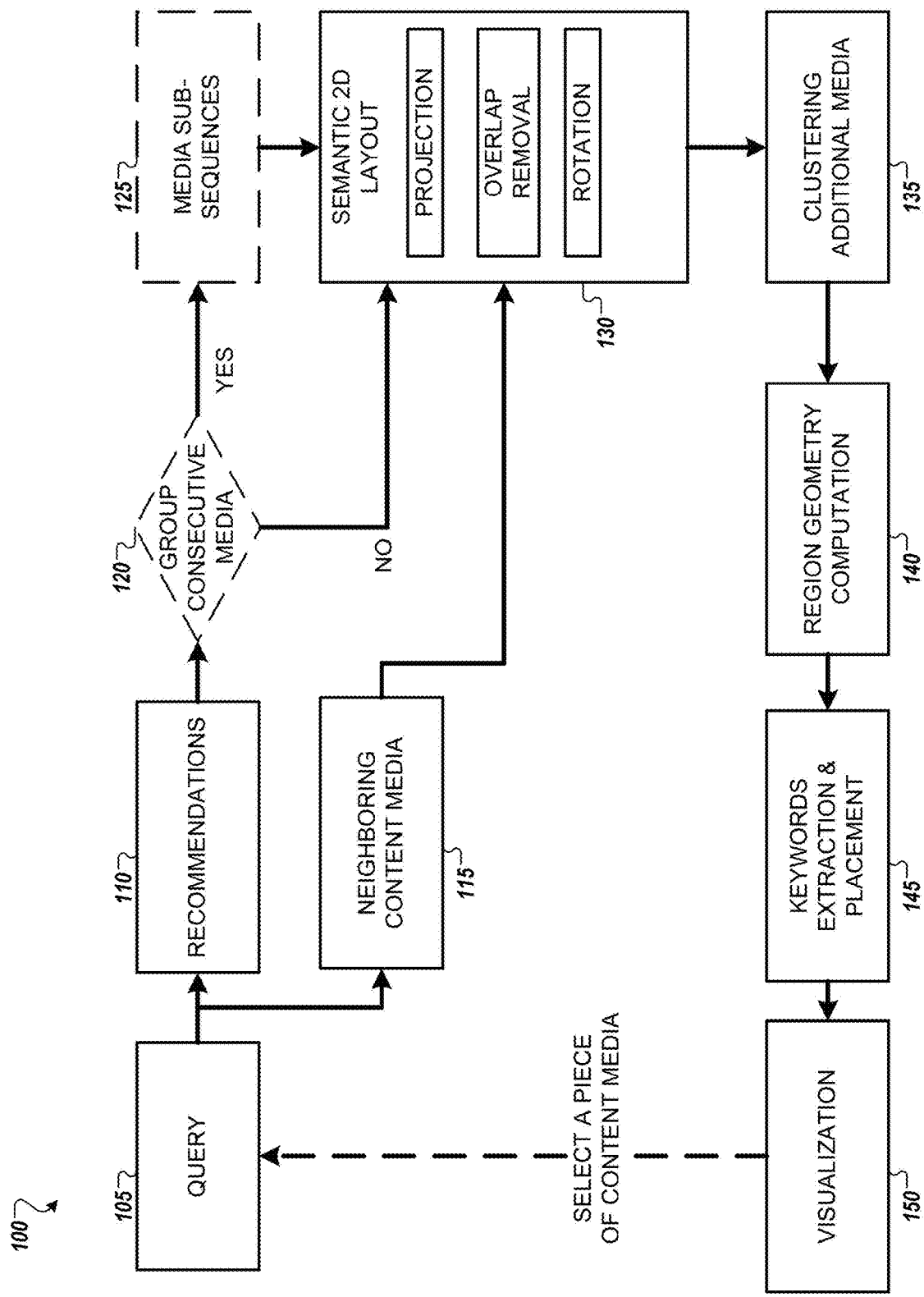
FIG. 1 illustrates a schematic representation of a system for generating a visualization in accordance with an example implementation of the present application.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

In this Application, methods to facilitate effective browsing of relevant content based on interactive visualization and on-the-fly video recommendation may be provided. For example, example embodiments may offer recommendations to enable learners to access content with multiple perspectives from related courses available on different platforms. Learners can interactively visualize and navigate recommended videos without becoming lost.

In some example implementations, video recommendation techniques detailed in related art may be used and any recommendation back end may be used. In example implementations, a proposed system may visualize both videos' topics and the sequential relationships between videos. An example implementation may also recommend short sub-sequences of videos in other courses, other than just individual videos, to provide additional context around specific concepts and simplify learning. Unlike conventional video recommendation results, a rank list or a set of rank lists, example implementations may also supports semantic visualization of recommended videos. This may provide additional dimensions for learners to explore related content and select what to watch next with more confidence.

Some example implementations may visualize recommendations using a combination of semantic and sequential context to enable users to more effectively select among the results. Such example implementations may allow for interactive visual exploration of the semantic space of recommendations within a user's current context. When compared to related art methods (e.g., content-based recommendation and rank list representations), initial evaluation of the proposed methods using a corpus of MOOC videos may suggests they help users make better video playback decisions.

FIG. 1 illustrates a schematic representation of a system 100 for generating a visualization in accordance with an example implementation of the present application. As illustrated in the system 100, a query 105 is first executed on a corpus of media content files (e.g., pieces of content media such as video files, audio files, image files, word files, or any other type of content media file that might be apparent to a person of ordinary skill in the art) stored in a database. In some example implementations, the query may be a selection of a piece of media content to be viewed or playing (e.g., the "viewed piece of media content"). The "viewed piece of media content" may include a content media file currently being viewed or a content media file previously viewed. When the query is executed, one or more recommendations 110 (e.g. recommended pieces of content media such as recommended video files, recommended audio files, recommended image files, recommended word files, or any other type of recommended content media father might be apparent to person of ordinary skill the art) may be returned from the database. In some example implementations, the query may be the selection or viewing of a content media file and the recommendations 110 may be identified based on content features of the selected or viewed content media file. Additionally, in some implementations, neighboring pieces of content media 115 (e.g., pieces of content media, which occur prior to or subsequent to one or more of the recommendations 110) may also be identified from the corpus of media content files.

Further, in some example implementations, the recommendations 110 may optionally be reordered if a user wants to group content media files according to predefined sequential structures (e.g., a syllabus or other organizational structure). For example, a determination 120 may be made whether multiple media content files occurring in a sequence should be indicated as recommendations 110 based on the query 105. If the determination 125 is yes, media sub-sequences 125 may be identified as the recommendations 110. Conversely, if the determination 125 is no, no media sub-sequences 125 may be identified.

Based on the results (e.g., the recommendations 110, neighboring piece of content media 115, and the optionally grouped media sub-sequences 125), a 2D projection-based layout method 130 may be applied to place the recommendations 110 and neighboring content media files 115 onto a canvas to reveal semantics of an informational space. The layout method 130 is discussed in greater deal below detail below with respect to the process 200 illustrated in FIG. 2. In some example implementations, the layout method 130 may include three steps: (1) projection (e.g., using multidimensional scaling), (2) overlap removal (e.g., using repulsive force to space the recommendations 110 and neighboring content media files 115), and (3) rotation of the recommendations 110 and neighboring content media files 115.

Once the recommendations 110 and neighboring content media files 115 have been placed, additional content media files 135 may be clustered around the recommendations 110 and neighboring content media files 115, based on their similarity and positions on the canvas. Further, the clustering results may be further used to generating semantic regions (e.g., by aggregating Voronoi cells of content media files within the same cluster) through region geometry computation 140. After that, the system 100 may extract keywords 145 from the media file contents, filter and rank the keywords, and place them around corresponding content media files to generate the visualization 150. Example implementations of a visualization are discussed in greater detail below respect to FIGS. 4-6.

In some example conditions, a selection of one of the recommendations 110, neighboring content media files 115, or additional content media files 135 may be identified by the system 100 as a new quarry 105 and the system 100 repeats to generate a new visualization. Thus, a user can thus explore the recommendations within the context of current content media file and may select a new content media file to watch. The selected content media file will be another query to the system 100 and cause the visualization to update.

Figure 2:
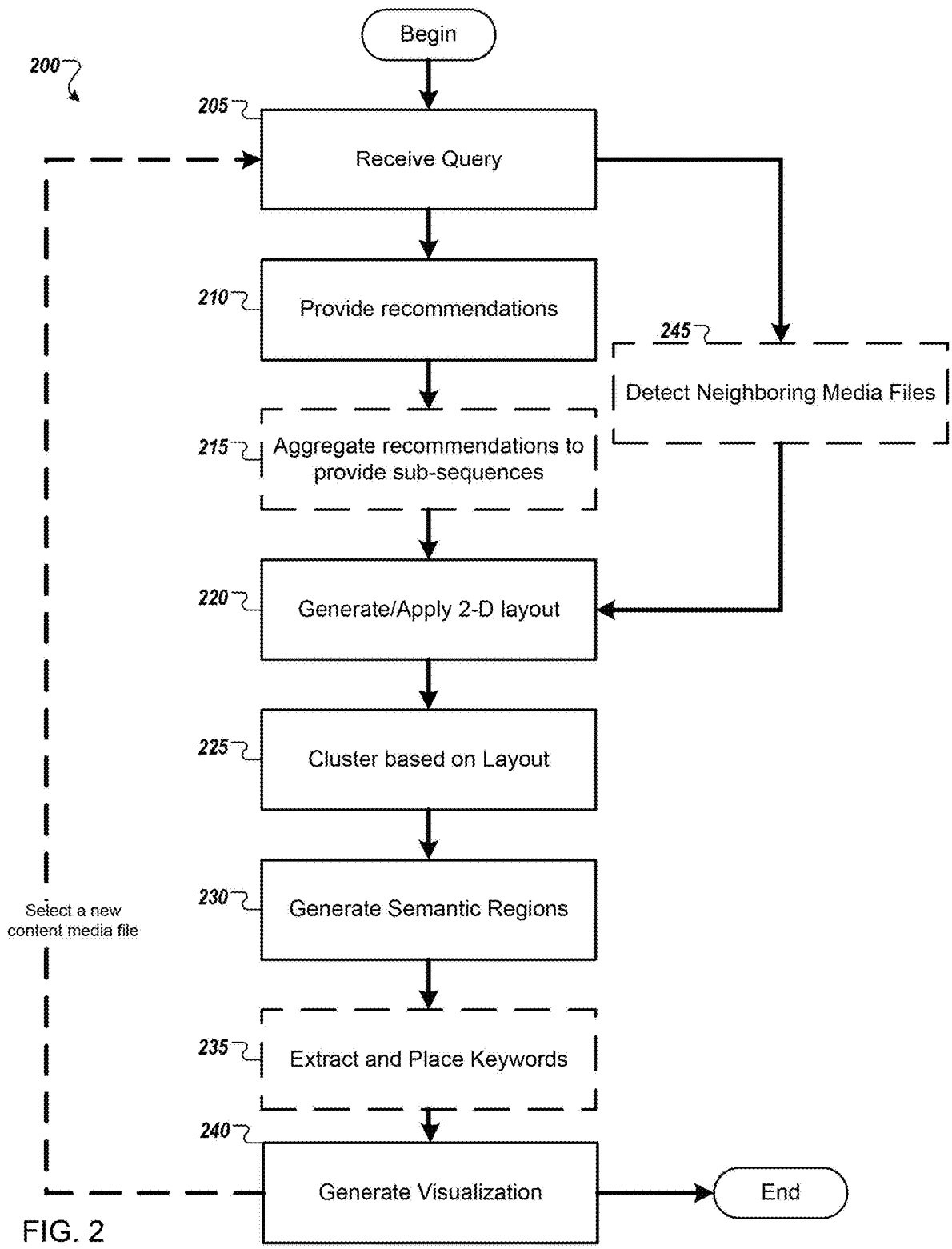
FIG. 2 illustrates a flow chart of a process for generating a visualization in accordance with an example implementation of the present application.

FIG. 2 illustrates a flow chart of a process 200 for generating a visualization in accordance with an example implementation of the present application. The process 200 may be perfoinied by a computing device such as computing device 805 in the computing environment 800 illustrated in FIG. 8 discussed below. Further, in some example implementations the computing device 805 may be part of a MOOC system. As illustrated, at 205 a query is received by the computing device. In some implementations, the query may be received through a text entry field or other user interface that may be apparent to personal murder skill the art. In other example implementations, the query may be received by a user selecting a content media file from the corpus of content media files stored in the database.

Based on the received query, one or more recommendations (e.g., recommended content media files) may be selected and identified from the corpus of content media files at 210. In some example implementations, the one or more recommendations may be selected and identified by a recommendation engine of a MOOC system. The recommendation engine of the MOOC system may serve two functions. First, it may pre-process the corpus to build the knowledge base by extracting content features from each of the content media files. For example, content recognition techniques such as object recognition, word recognition, text recognition, audio recognition, character recognition, facial recognition or any other recognition technique that may be apparent to a person of ordinary skill in the art may be used to extract content features associated with each of the content media files. The knowledge base contains not only content feature representations of content features extracted from each of the content media files, but also sequential relationships (e.g. expressed in a syllabi) linking the content media files.

Once generated the knowledge base maybe used to provide recommendations at runtime. The recommendation engine may produce a ranked list related to the query representing its estimate of documents likely to be viewed next based on the similarity of content features with the query.

In addition to being used to provide the recommendations at 210, the knowledge base may also be used to detect neighboring media files relative to a media file currently being viewed at 245. For example, content media files occurring prior to or subsequent to a content media file currently being viewed on a syllabus or other organizational structure may be retrieved from the corpus stored in the database.

Additionally, in some example implementations, the recommendation engine output may be optionally aggregated to determine the most prominent media file sub-sequences at 215. Implementations this may be performed by scanning the top ranks recommendations in the recommendations list and grouping them in sequential order if the recommended content media files are adjacent to one another in their original organizational structure (e.g., their original course syllabus, etc.). In some example implementations, the sub-sequences may be constrained to a user determined maximum length, and a greedily search down process may be performed on the recommendation list and tell a desired number of sub-sequences is assembled. It should be noted, that in sub-sequences only a single content media file may be provided. Once one or more content media file sub-sequences been generated, the average ranking score of each member of the sub-sequences may be averaged and compared to individual recommendation scores for ranking purposes. In some example plantations, generation of sub-sequences may provide more contextual information for learners to understand course concepts compared to recommendations based purely on content feature similarity scores.

At 220, a two dimensional layout is applied or generated based on the recommendations, neighboring media files, and optionally generated content media file sub-sequences onto a canvas to reveal semantics of an informational space. An example implementation of a sub-process 300 for generating the two dimensional layout is discussed in greater detail below with respect to FIG. 3.

After the two dimensional layout is applied or generated, clustering may be applied to place the content media files onto the two dimensional layout at 225. For example, to help learners better make sense multidimensional scaling of the layout, clustering, such as agglomerative clustering, of the content media files may be performed using their topic features to distribute the content media files on the layout.

Further, the two dimensional layout generated at 220 may be divided into a plurality of semantic regions at 230. For example, each region may exhibits a relatively coherent set of topics and concepts extracted from the selected content media files from 210 above. In some example implementations, the boundaries of the regions may be shown as subtle white polylines, determined by aggregating Voronoi cells of content media files in the same cluster from 225.

Further, at 235 of process 200 frequent topical keywords may optionally be extracted from the clusters of content media files (e.g., text transcripts of each video cluster, character recognition text detected from any image or written content media files, or any other detected features associated with the content media files that may be apparent to a person of ordinary skill in the art) and layered on the regions to reveal contextual information of different regions of the projection (Example implementations are discussed in greater detail below). In some example implementations, a standard TF-IDF method may be applied to obtain discriminative keywords and then the keywords may be re-weight based on terms in content media file titles. These keywords may be placed using a force directed layout, and optionally, may be hidden if users feel overwhelmed. In some example implementations, more advanced methods of placement, such as energy based optimization may be implemented to position the keywords. In some example implementations, placement of the keywords may provide helpful semantic structure in the information space of the two dimensional layout.

At 240, the visualization may be generated once the semantic regions are generated at 230, and the keywords, optionally, extracted and placed at 235. Once the visualization is generated it may be displayed to a user on a display device such as a computer monitor, television, display panel, protector screen, or touch screen associated with a mobile device. After the visualization has been generated, the process 200 may end in some example implementations. In other example implementations, a user input selecting one of the displayed recommendations or neighboring content media files may be received and the process 200 may return to 205 and continue from forward from there.

Figure 3:
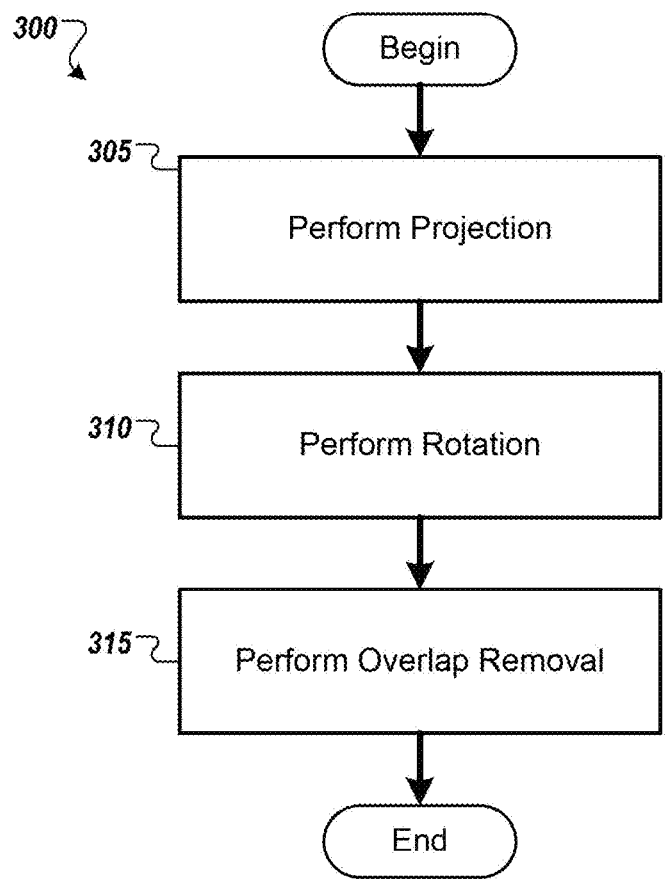
FIG. 3 illustrates a flow chart of a process for generating/applying a two dimensional layout as part of generating a visualization in accordance with an example implementation of the present application.

FIG. 3 illustrates a flow chart of a process 300 for generating/applying a two dimensional layout as part of generating a visualization in accordance with an example implementation of the present application. The process 300 may be performed by a computing device such as computing device 805 in the computing environment 800 illustrated in FIG. 8 discussed below as part of a process for generating a visualization such as the process 200 discussed above.

In process 300, multidimensional scaling (MDS) may be performed on recommendation results, such as those provided in 220 of process 200, may be performed to project content media files onto an exploration canvas to convey their distances in the recommendation space using proximity to indicate similarity at 305. Moreover, when performing MDS, recommended sub-sequences may be treated as a unit (i.e., by averaging their recommendation distances to other videos), and then render videos of the sub-sequence from left to right in a roughly horizontal line and connect them together (See elements 502A and 502B illustrated in the example implementation illustrated in FIG. 5A discussed below).

In MDS projection, only the relative distance between items may have meaning and the axes do not, the layout may be rotated to make the content media files in the current course flow from left to right, aligning with the natural sequence of the content media files on either side at 310. This rotation may ease comprehension of the visualization. In some example implementations, to obtain the angle to rotate, the center of the videos before the current video in the MDS layout may be calculated and then used to for form a vector from the previous center of one content media file to the next, with use the angle being between this vector and the positive direction of x-axis (See example implementations in FIGS. 5A and 5B discussed below). However, in some example implementations, zig-zags in a longer video sequence may occur, which may not be completely rotated corrected. This may be acceptable to a user, as learners may usually focus more on semantics in a local space, and not include large numbers of neighboring videos in the Exploration Canvas.

Further, to minimize overlap of circles, a repulsive force between content media files may be provided at 315 to obtain the final layout. A learner can also disable this sequence-based layout and position each video individually based the MDS projection, in order to gain a different perspective of the recommendations (See example implementation in FIG. 5C discussed below).

Figure 4:
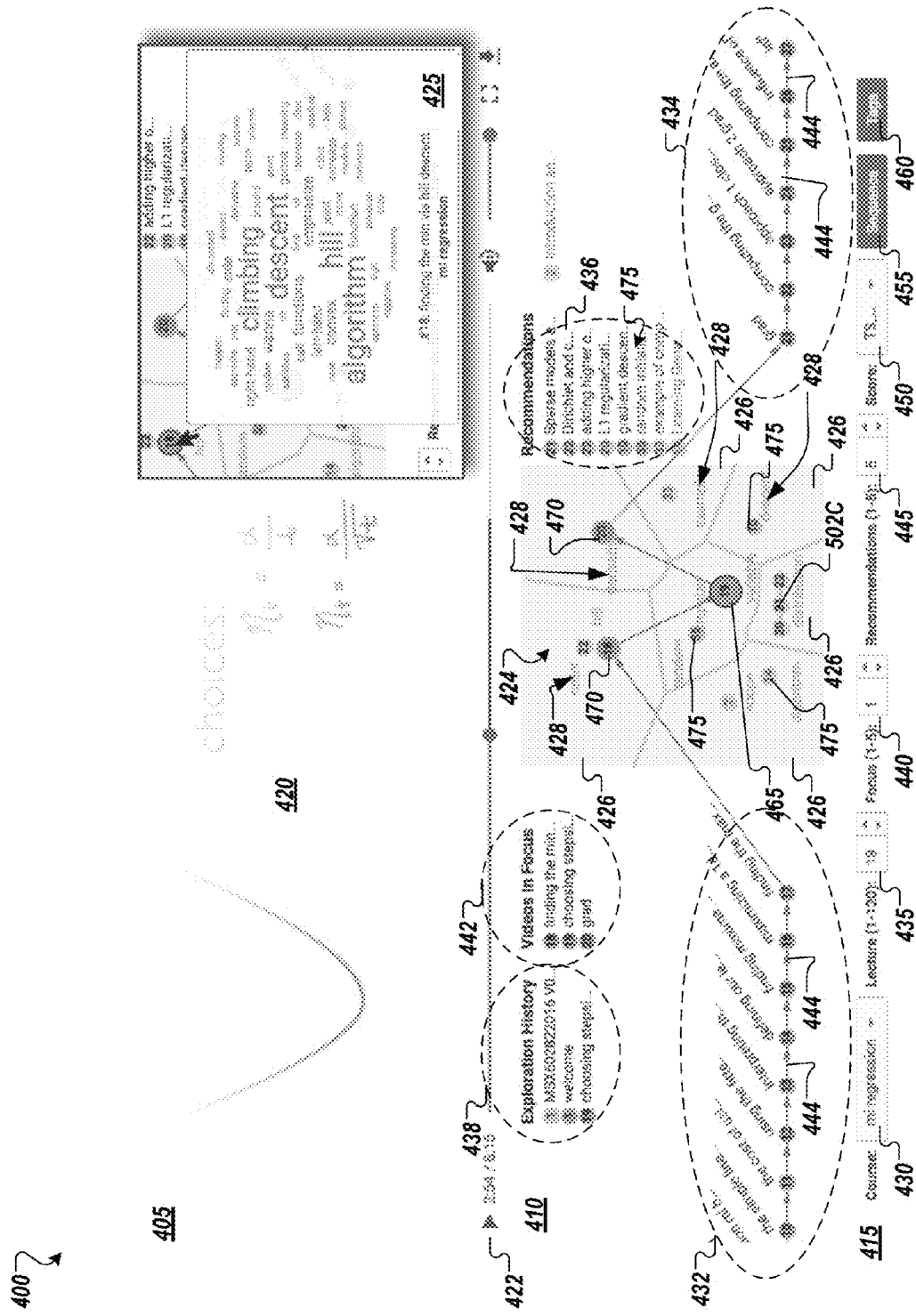
FIG. 4 illustrates a user interface (UI) of a content media file recommendation system in accordance with an example implementation of the present application.

FIG. 4 illustrates a user interface (UI) 400 of a content media file recommendation system in accordance with an example implementation of the present application. In some example implementations, the UI 400 may be a visual interface of a MOOC system. As illustrated, FIG. 4 includes three parts: a Video Panel 405, a Recommendation Panel 410, and a Configuration Panel 415. In some example implementations, the Video Panel 405 is a normal media player in which users can watch a selected content media file. As illustrated, the video panel 405 may include a display area 420, which the user may use to view the selected content media file and a media control bar 422, which the user may use to control the playback of the selected content media file.

The Recommendation Panel 410 is the main interface where a user can explore the recommended content media files 475 (or sub-sequences 502C) and understand relationships between them, to inform their choice of an appropriate content media file to watch next. As illustrated, the recommendation panel 410 includes the layout region 424 which illustrates the current content media file 465 currently being viewed as well as the neighboring content media files 470 which immediately proceed and immediately succeed the current content media file 465. The layout region 425 is divided into a plurality of regions 426 based on semantics associated with content features extracted from the plurality of content media files (e.g., the recommendations 475, the neighboring content media files 470 and the current content media file 465) being displayed. The layout region 425 also includes keywords 428 extracted from the content features associated with the plurality of content media files and placed into the respective plurality of regions 426.

In the recommendation panel 410, other content media files in the same sequence as the current content media file 465 and neighboring media files 470 are shown in preceding region 432 and succeeding region 434 outside of the layout region 424. In other words, the recommendation panel displays the current content media file 465, the neighboring content media files 470, and the recommendations 475 in the two-dimensional layout region 424 (e.g., an Exploration Canvas) in the middle, and shows other content media files in the current course linearly on both sides in preceding region 432 and succeeding region 434. The content media files in the original course with the current video are connected with gray arrows 444 to indicate their order in the structural organization (e.g., a syllabus of other course structural organization). Each content media file may be represented as a circle with a number indicating its position in the associated course syllabus. In some example imitations, color hues of the circles associated with the content media files (e.g., the current content media file 465, the neighboring media files 470 and the recommendations 475) encode different courses. In the layout region 424, color opacity may indicate the rank of that content media file in the recommendation list (e.g., the lighter the color, the lower the rank). In some example implementations, the number of videos displayed in the layout region 424 may be adjustable using the configuration panel 415 discussed below.

In some example imitations, hovering over one of the plurality of regions 426 of the layout region 424 may display a word cloud 425 of keywords associated with the region 426 as a pop-up window 407. In the displayed word cloud, the size of the words displayed may represent the strength of similarity or frequency of occurrence associated with each keyword.

Additionally, in some example implementations, the recommendation panel 410 may include a region 436 where the recommendations 475 are ranked based on their content similarity to the current content media file 465. The recommendation panel 410 may also include a region 438 showing the user's exploration history and a region 442 listing the current content media file 465 and the neighboring content media file 470 (e.g., Content Media in Focus) currently displayed in the layout region 424. The regions 436, 438, and 442 may provide interactive linking of the same content media files when hovered over in the regions 436, 438, 442 or in the layout region 424. Also, clicking any of the content media files selects it as the current content media file 465 updates the UI 400. The above interface features allow learners to quickly get a basic sense of the content media file and navigate through the information.

Using the Configuration Panel 415, a user can manipulate basic parameters about how recommendations are displayed, as well as select specific courses and lecture content media files to view. As illustrated, and some example implementations the configuration panel 415 may include a drop-down box 430 that can be used to select a specific course from which content media files may be selected for display. Further, the configuration panel 415 may also include a numerical entry box 435 that may be used to jump to a specific lecture in the course. The configuration panel 415 may also include another numerical entry field 440 that can be used to specify the number of neighboring content media files 470 to display in the layout region 424. Further, in some example implementations the configuration panel 415 may include a numerical entry field 445 that may be used to specify the minimum number of recommendations 475 to be displayed in the layout region 424. Additionally, the configuration panel 415 may also include a drop-down menu 450 that may be used to select a method of calculating similarity scores between the current content media file 465 and the recommendations 475. The configuration panel 415 may also include toggle buttons 455 and 460 that may be used to display and/or hide the sequence of content media files illustrated in regions 432 and 434 and the tags associated with the content media files, respectively.

Figures 5A, 5B, 5C:
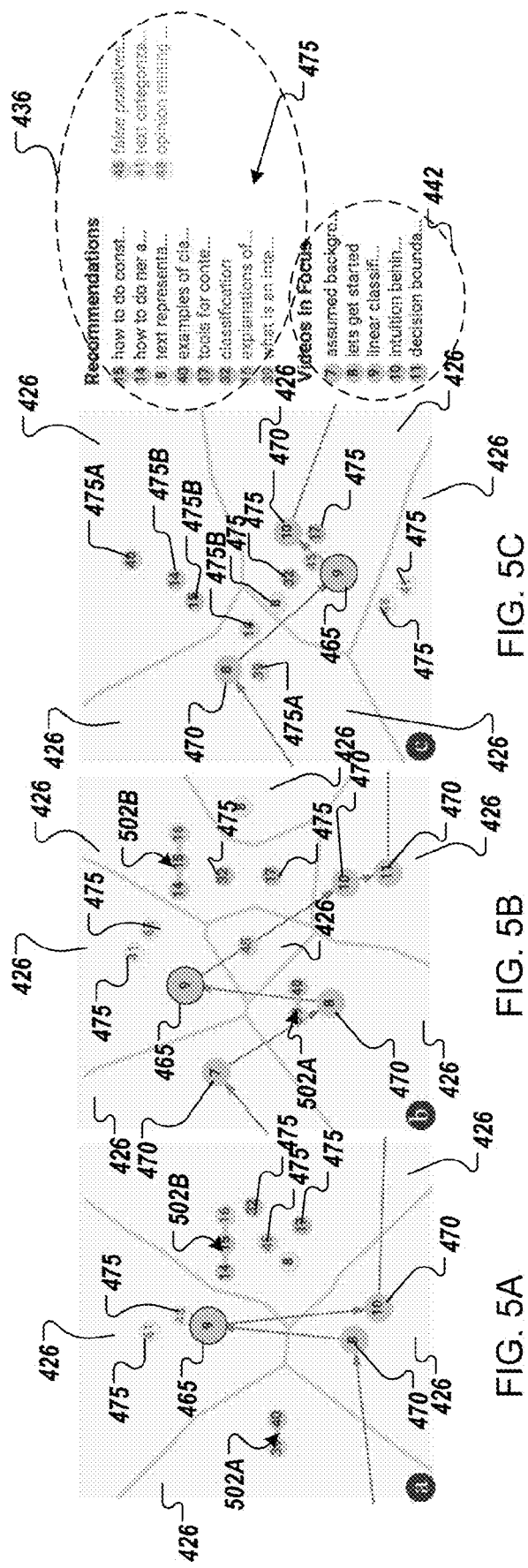
FIGS. 5A-5C illustrate example implementations of the layout region illustrated in the UI of FIG. 4 in alternative configurations.

FIGS. 5A-5C illustrate example implementations of the layout region 424 illustrated in UI 400 of FIG. 4 in alternative configurations. Specifically, FIG. 5A illustrate an example of implementation where user has selected to display two neighboring content media file 470 adjacent the current content media file 465. Similarly FIG. 5B illustrates an example implementation where a user has selected to display for neighboring content media files 470 adjacent the current content media file 465. Further, FIG. 5C illustrates an example implementation where content media files in sub-sequences 502A and 502B have been separated into their individual content media files 475A. As illustrated, as the number of neighboring content media files 470 is changed, or the sub-sequence content media files 502A and 502*b* are linked/de-linked, the placement and size of the regions 426 is dynamically adjusted. Additionally, the placement of the content media files (e.g., the current content media file 465, the neighboring content media files 470 and the recommendations 475 are shifted through rotation and overlap removal as discussed above with respect to FIGS. 2 and 3. Further, the recommendation region 436 and the Content Media in Focus region 442 may be updated based on the changes the user makes.

Evaluation

Applicant has carried out at least two experiments to evaluate the effectiveness and usefulness of example implementations of the present application. The purposes of the experiments were to understand how example implementations may be used on MOOC platforms in a more qualitative manner, from both MOOC instructor and learner perspectives. These experiments are briefly discussed below.

Interviews With MOOC Instructors

As a first experiment, Applicant's conducted semi-structured interviews with two MOOC instructors to collect qualitative feedback about example implementations of the present application. The two MOOC instructors were requited from different universities. They both had many years of teaching experience in traditional classrooms and have taught several MOOCs in recent years. One was from a computer science background (E1), and the other was specialized in quantitative methods in social science (E2). During the interviews, Applicants first introduced some background and demonstrated the features of example implementations of the present application, and then asked them to try the example implementations, during which time the instructor's comments were collected. A "think aloud protocol" was employed, and the instructors were required to give feedback from both instructors' and students' perspectives. Applicants recorded the whole interview sessions and took notes when necessary. Each interview lasted roughly one hour.

In general, the instructors appreciated the tool offered by example implementations and liked the aspects that it can enhance flexibility for learning. They both agreed that the related art systems with fixed syllabi were big limitations for certain learner groups. Also, they were eager to apply the tool in their own MOOC offerings and were curious about how it could affect students' performance and learning behaviors.

The instructors were also excited about the capabilities of the tool for potentially improving their teaching. They said that the example implementations could be useful for course preparation. More particularly, "I normally don't look at what others teach, but the tool provides the awareness of related lectures, so I could borrow some materials to enhance my lecture, and avoid unnecessary duplication," E1 commented. The instructors also indicated that the example implementations of the present application might be used for dynamically guiding the support offered on course forums, for example, pointing out details and questions covered in recommended videos but not in a current course. E2 commented that the visualization could provide objective feedback to the design of a course. For example, he said: "If you see one lecture is here [on the Exploration Canvas], then you go very far for the second lecture, and back here again for the third lecture, you should really think about reordering the content presented in the videos."

Laboratory Study With MOOC Learners

Applicant also carried out a laboratory study to better understand how example implementations might be used. For example, Applicant recruited 12 participants (9 males, 3 females; aged 20-50) from an IT company; all of them had taken MOOCs before and held Masters and/or PhDs in computer science or a related field and thus, represents a professional learner group. All participants had some level of knowledge about machine learning (but were not experts) to match the experimental corpus of content media files. Further, all of the participants had experienced video recommendations on other content media sites (e.g., YOUTUBE, NETFLIX, etc.) and all had taken MOOCs in the past (but may not have completed them).

Figure 6:
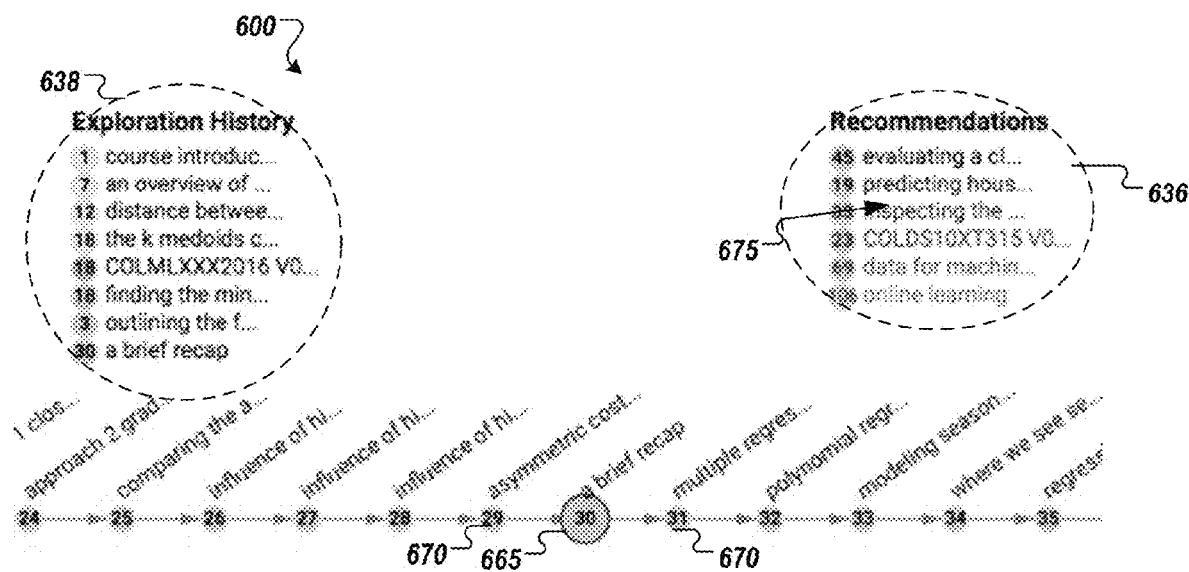
FIG. 6 illustrates a baseline visualization used for comparative analysis.

Applicant compared example implementations with a baseline visualization in a comparative example. FIG. 6 illustrates the baseline visualization 600 used for comparison purposes. As illustrated, the baseline visualization provides 600 just the recommendations 475 in a list in a region 636 without layout 424 (e.g., Exploration Canvas) illustrated in FIG. 4. The baseline visualization 600 also included a region 638 displaying an exploration history and the current content media file 665 shown in a linear sequence with adjacent neighboring content media files 670.

For the participants, the experimental task was to select the most meaningful content media file to watch next from the recommendations of a particular content media file, with the presentation in one of the two conditions. Participants were asked to talk aloud why they chose each content media file, and then watch/skim that content media file to indicate if they felt it was a good choice. Their choice may be affected by many subjective matters. However, Applicant was more interested in behavioral changes of participants across the two conditions, because there is no right answer for choosing content media files. Applicant hypothesized that participants have more deliberate reasoning in mind for taking actions in the example implement conditions.

Figure 7:
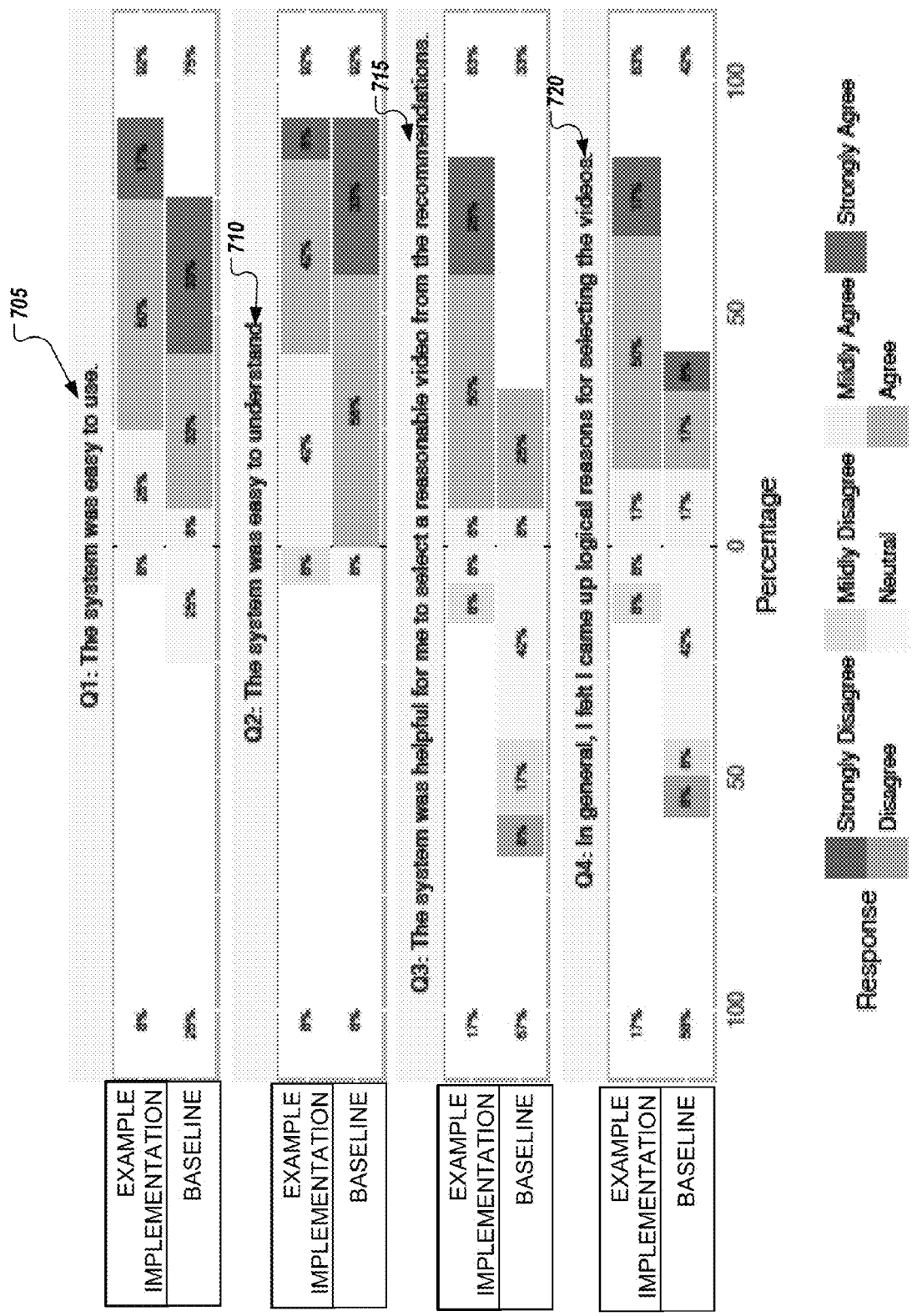
FIG. 7 illustrates a graphical representation of the results of a post-study questionnaire used to compare an example implementation and the baseline.

FIG. 7 illustrates a graphical representation of the results of a post-study questionnaire used to compare an example implementation and the baseline. From the post-study questionnaire, participants felt they had made a good and logical choice in 32 out of 36 tasks (88.9%) with the example implementation, compared to 25 out of 36 tasks (69.4%) with the baseline. Although subjective, these results indicate that the example implementation helped participants make better and more confident choices. The post-study questionnaire further shows that participants thought the example implementation was roughly as easy to use (results question 1-705) and about as easy to understand (results question 2-710) as baseline.

Although there were more visual elements in the example implementation than baseline, participants did not find it more difficult to use (the example implementation: M=6; IQR=1; the baseline: M=6; IQR=2:25). Similarly, the example implementation was perceived slightly less easy to understand, which is plausible because it was a new interface. However, the effect was small (the example implementation: M=5:5; IQR=1; the baseline: M=6; IQR=1), indicating that participants accepted the example implementation well and quickly.

In FIG. 7, Applicant observed that participants thought the example implementation was more helpful in selecting videos from recommendations (the example implementation: M=6; IQR=0:5; baseline: M=4; IQR=1:5), (results question 3-715) and helped them make more logical choices (example implementation: M=6; IQR=1; baseline: M=4; IQR=1:25) (results question 4-720). Applicant interprets this as indicating that the example implementation was more effective for users to make sense of the information space and select reasonable content media files from the recommendations.

Example Computing Environment

Figure 8:
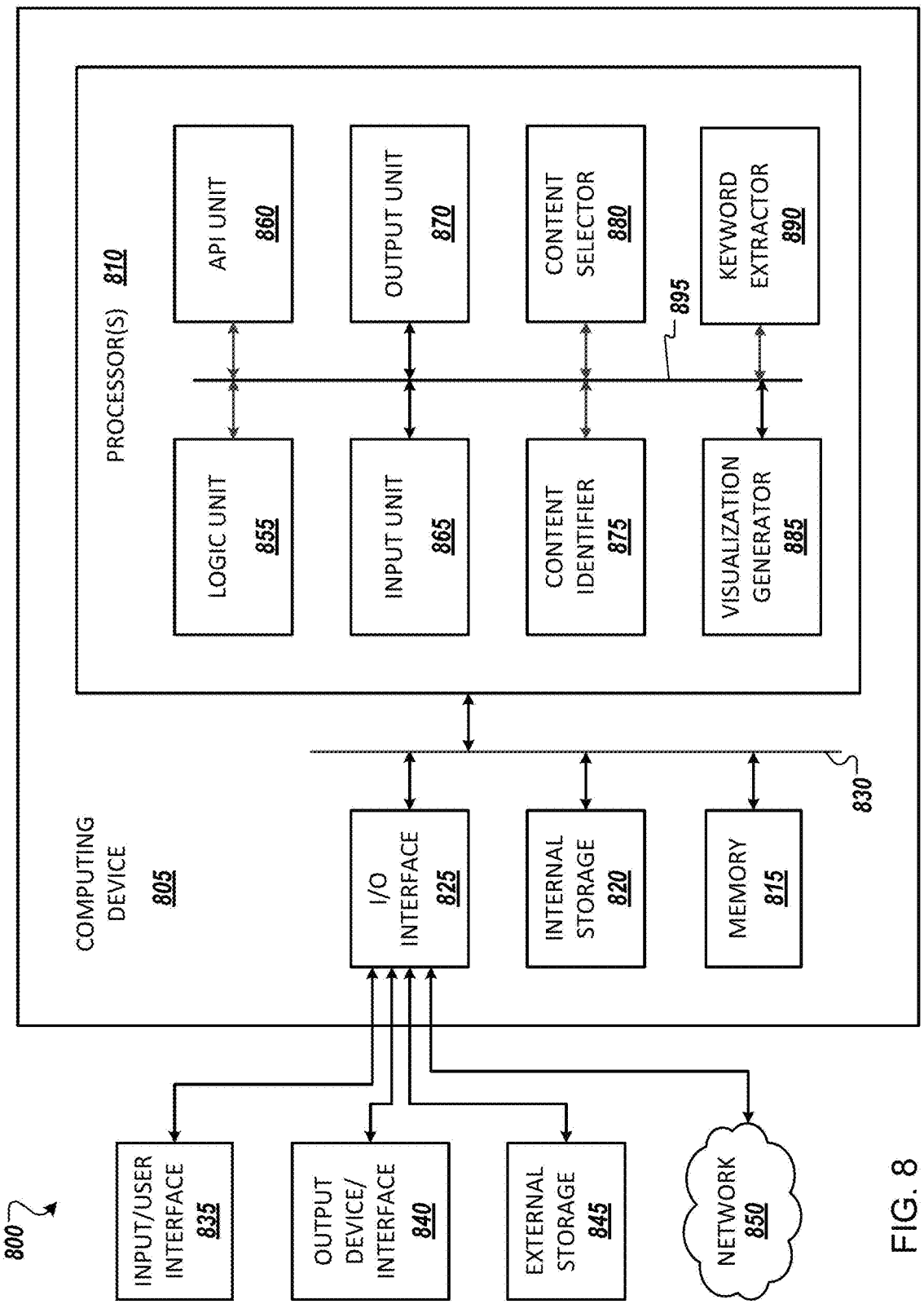
FIG. 8 illustrates an example computing environment with an example computer device suitable for use in some example implementations of the present application.

FIG. 8 illustrates an example computing environment 800 with an example computer device 805 suitable for use in some example implementations. Computing device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computing device 805.

Computing device 805 can be communicatively coupled to input/user interface 835 and output device/interface 840. Either one or both of input/user interface 835 and output device/interface 840 can be a wired or wireless interface and can be detachable. Input/user interface 835 may include any device, component, sensor, or interface, physical or virtual, which can be used to provide input (e.g., buttons, touch-screen interface, keyboard, a pointing/cursor control, microphone, camera, braille, motion sensor, optical reader, and/or the like). Output device/interface 840 may include a display, television, monitor, printer, speaker, braille, or the like. In some example implementations, input/user interface 835 and output device/interface 840 can be embedded with, or physically coupled to, the computing device 805. In other example implementations, other computing devices may function as, or provide the functions of, an input/user interface 835 and output device/interface 840 for a computing device 805.

Examples of computing device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 805 can be communicatively coupled (e.g., via I/O interface 825) to external storage 845 and network 850 for communicating with any number of networked components, devices, and systems, including one or more computing devices of the same or different configuration. Computing device 805 or any connected computing device can be functioning as, providing services of, or referred to as a server, client, thin server, general machine, special-purpose machine, or another label.

I/O interface 825 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computing device 805 can use and/or communicate using computer-usable or computer-readable media, including transitory media and non-transitory media. Transitory media includes transmission media (e.g., metal cables, fiber optics), signals, carrier waves, and the like. Non-transitory media included magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 810 can execute under any operating system (OS) (not shown), in a native or virtual environment. One or more applications can be deployed that include logic unit 855, application programming interface (API) unit 860, input unit 865, output unit 870, content identifier 875, content selector 880, visualization generating unit 885, keyword extractor 890 and inter-unit communication mechanism 895 for the different units to communicate with each other, with the OS, and with other applications (not shown). For example, the content identifier 875, the content selector 880, the visualization generator 885, and keyword extractor 890 may implement one or more processes shown in FIGS. 2 and 3. The described units and elements can be varied in design, function, configuration, or implementation and are not limited to the descriptions provided.

In some example implementations, when information or instruction is received by API unit 860, it may be communicated to one or more other units (e.g., logic unit 855, input unit 865, content identifier 875, content selector 880, visualization generator 885, and keyword extractor 890). For example, the content identifier 875 may identify a content media file or piece of media content and the content selector 880 may select a content media file or piece of media content having a sequential relationship with the identified content media file or piece of media content. Similarly, the keyword extraction unit 890 may extract content features from the content media files and assign keywords based on the extracted content features. Additionally, the keyword extraction unit 880 may provide the keywords to the visualization generating unit 890 that generates a visualization based on the identified content media file, the selected content media file and the extracted keywords.

In some instances, the logic unit 855 may be configured to control the information flow among the units and direct the services provided by API unit 860, input unit 865, content identifier 875, content selector 880, visualization generator 885, and keyword extractor 890 in some example implementations described above. For example, the flow of one or more processes or implementations may be controlled by logic unit 855 alone or in conjunction with API unit 860.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A method of visualizing recommended pieces of media content based on a viewed piece of media content, the method comprising:
    identifying at least a first piece of media content associated with a received content feature of the viewed piece of media content, the viewed piece of media content included as part of a corpus of pieces of media content, each piece of media content of the corpus of pieces of media content being related in accordance with an ordered sequence;
    selecting at least a second piece of media content linked to the viewed piece of media content based on the ordered sequence;
    generating a two-dimensional visualization of recommended pieces of media content on a graphical user interface based on (i) content similarity between the identified at least one first piece of media content and the viewed piece of media content and (ii) the ordered sequential relationship between the selected at least one second piece of media content and the viewed piece of media content, generating the two-dimensional visualization comprises:
        generating a two-dimensional projection based layout to place the identified at least one first piece of media content, the viewed piece of media content, the selected at least one second piece of media content on a digital canvas,
        dividing the digital canvas into semantic regions based on semantic information associated with content features of each of the identified at least one first piece of media content, the viewed piece of media content, the selected at least one second piece of media content; and
    displaying the generated two-dimensional visualization by:
        displaying, in a first semantic region, a first icon representing the viewed piece of media content clustered with a second icon representing the identified at least one first piece of media content based on content similarity between the identified at least one first piece of media content and the viewed piece of media content, and
        displaying, in a second semantic region, a third icon representing the selected at least one second piece of media content adjacent to the first icon based on the ordered sequential relationship between the selected at least one second piece of media content and the viewed piece of media content.

2. The method of claim 1, wherein the selecting the at least one second piece of media content comprises:
    selecting at least one prior piece of media content occurring prior to the viewed piece of media content in the ordered sequential relationship; and
    selecting at least one subsequent piece of media content occurring subsequent to the viewed piece of media content in the ordered sequential relationship; and
    wherein the generating the two-dimensional visualization comprises arranging the identified at least one first piece of media content, the viewed piece of media content, the selected at least one prior piece of media content and the selected at least one subsequent piece of media content based on the ordered sequential relationship and content similarities.

3. The method of claim 2, wherein the generating the two-dimensional visualization comprises applying the two-dimensional projection based layout.

4. The method of claim 3, wherein the generating the two-dimensional visualization further comprises:
    extracting keywords from the content features of each of the identified at least one first piece of media content, the viewed piece of media content, the selected at least one prior piece of media content and the selected at least one subsequent piece of media content; and
    placing the extracted keywords into the regions associated with the semantic information based on the ordered sequential relationship and content similarities.

5. The method of claim 2, further comprising placing a plurality of other pieces of media content on the generated two-dimensional visualization based on at least one of content similarities or ordered sequential relationships with the identified at least one first piece of media content, the viewed piece of media content, the selected at least one prior piece of media content and the selected at least one subsequent piece of media content.

6. The method of claim 5, further comprising generating sub-sequence clusters between two or more pieces of media content selected from the plurality of other pieces of media content, the identified at least one first piece of media content, the viewed piece of media content, the selected at least one prior piece of media content and the selected at least one subsequent piece of media content,
    wherein the generating the sub-sequence clusters are generated based on both an ordered sequential relationship between the two or more pieces of media content and content similarity values of the two or more pieces of media content exceeding a threshold.

7. The method of claim 6, further comprising receiving a user input selecting a piece of media content from the plurality of other pieces of media content, the selected at least one prior piece of media content and the selected at least one subsequent piece of media content; and
    a generating a new visualization based on content features and sequence relationships associated with the user input selected piece of content media.

8. The method of claim 7, wherein the generating the new visualization comprises:
    selecting at least one new prior piece of media content occurring prior to the user input selected piece of media content in one of the ordered sequential relationships associated with the user input selected piece of media content; and selecting at least one new subsequent piece of media content occurring subsequent to the user input selected piece of media content in one of the ordered sequential relationships associated with the user input selected piece of media content; and wherein the generated new two-dimensional visualization comprises arranging user input selected piece of media content, the selected at least one new prior piece of media content and the at least one new subsequent piece of media content based on the one of the ordered sequential relationships associated with the user input selected piece of media content and content similarities.

9. A non-transitory computer readable medium having stored therein a program for making a computer execute a method of visualizing recommended pieces of media content based on a viewed piece of media content, the method comprising:

identifying at least a first piece of media content associated with a received content feature of the viewed piece of media content, the viewed piece of media content included as part of a corpus of pieces of media content, each piece of media content of the corpus of pieces of media content being related in accordance with an ordered sequence;

selecting at least a second piece of media content linked to the viewed piece of media content based on the ordered sequence;

generating a two-dimensional visualization of recommended pieces of media content on a graphical user interface based on (i) content similarity between the identified at least one first piece of media content and the viewed piece of media content and (ii) the ordered sequential relationship between the selected at least one second piece of media content and the viewed piece of media content, generating the two-dimensional visualization comprises:

generating a two-dimensional projection based layout to place the identified at least one first piece of media content, the viewed piece of media content, the selected at least one second piece of media content on a digital canvas, dividing the digital canvas into semantic regions based on semantic information associated with content features of each of the identified at least one first piece of media content, the viewed piece of media content, the selected at least one second piece of media content; and displaying the generated two-dimensional visualization by:

displaying, in a first semantic region, a first icon representing the viewed piece of media content clustered with a second icon representing the identified at least one first piece of media content based on content similarity between the identified at least one first piece of media content and the viewed piece of media content, and displaying, in a second semantic region, a third icon representing the selected at least one second piece of media content adjacent to the first icon based on the ordered sequential relationship between the selected at least one second piece of media content and the viewed piece of media content.

10. The non-transitory computer readable medium of claim 9, wherein the selecting the at least one second piece of media content comprises:

selecting at least one prior piece of media content occurring prior to the viewed piece of media content in the ordered sequential relationship; and selecting at least one subsequent piece of media content occurring subsequent to the viewed piece of media content in the ordered sequential relationship; and wherein the generating the two-dimensional visualization comprises arranging the identified at least one first piece of media content, the viewed piece of media content, the selected at least one prior piece of media content and the selected at least one subsequent piece of media content based on the ordered sequential relationship and content similarities.

11. The non-transitory computer readable medium of claim 10, wherein the generating the two-dimensional visualization comprises applying the two-dimensional projection based layout.

12. The non-transitory computer readable medium of claim 11, wherein the generating the two-dimensional visualization further comprises:

extracting keywords from the content features of each of the identified at least one first piece of media content, the viewed piece of media content, the selected at least one prior piece of media content and the selected at least one subsequent piece of media content; and placing the extracted keywords into the regions associated with the semantic information based on the ordered sequential relationship and content similarities.

13. The non-transitory computer readable medium of claim 11, further comprising placing a plurality of other pieces of media content on the generated two-dimensional visualization based on at least one of content similarities or ordered sequential relationships with the identified at least one first piece of media content, the viewed piece of media content, the selected at least one prior piece of media content and the selected at least one subsequent piece of media content.

14. The non-transitory computer readable medium of claim 13, further comprising generating sub-sequence clusters between two or more pieces of content media selected from the plurality of other pieces of media content, the identified at least one piece of media content, the viewed piece of media content, the selected at least one prior additional piece of media content and the selected at least one subsequent piece of media content, wherein the generating the sub-sequence clusters are generated based on both an ordered sequential relationship between the two or more pieces of media content and content similarity values of the two or more pieces of media content exceeding a threshold.

15. The non-transitory computer readable medium of claim 14, further comprising receiving a user input selecting a piece of media content from the plurality of other pieces of media content, the selected at least one prior piece of media content and the selected at least one subsequent piece of media content; and a generating a new visualization based on content features and sequence relationships associated with the user input selected piece of media content.

16. The non-transitory computer readable medium of claim 15, wherein the generating the new visualization comprises:

selecting at least one new prior piece of media content occurring prior to the user input selected piece of media content in one of the ordered sequential relationships associated with the user input selected piece of media content; and selecting at least one new subsequent piece of media content occurring subsequent to the user input selected piece of media content in one of the ordered sequential relationships associated with the user input selected piece of media content; and wherein the generated new two-dimensional visualization comprises arranging user input selected piece of media content, the selected at least one new prior piece of media content and the at least one new subsequent piece of media content based on the one of the ordered sequential relationships associated with the user input selected piece of media content and content similarities.

17. A computer apparatus configured to analyze a corpus comprising a plurality of pieces of content media, the computer apparatus comprising:

a memory storing the plurality of pieces of content media; and a hardware processor executing a process of visualizing recommended pieces of media content based on a viewed piece of media content, the process comprising:

identifying at least a first piece of media content associated with a received content feature of the viewed piece of media content, the viewed piece of media content included as part of a corpus of pieces of media content, each piece of media content of the corpus of pieces of media content being related in accordance with an ordered sequence;

selecting at least a second piece of media content linked to the viewed piece of media content based on the ordered sequence;

generating a two-dimensional visualization of recommended pieces of media content on a graphical user interface based on (i) content similarity between the identified at least one first piece of media content and the viewed piece of media content and (ii) the ordered sequential relationship between the selected at least one second piece of media content and the viewed piece of media content, generating the two-dimensional visualization comprises:

generating a two-dimensional projection based layout to place the identified at least one first piece of media content, the viewed piece of media content, the selected at least one second piece of media content on a digital canvas, dividing the digital canvas into semantic regions based on semantic information associated with content features of each of the identified at least one first piece of media content, the viewed piece of media content, the selected at least one second piece of media content; and displaying the generated two-dimensional visualization by:

displaying, in a first semantic region, a first icon representing the viewed piece of media content clustered with a second icon representing the identified at least one first piece of media content based on content similarity between the identified at least one first piece of media content and the viewed piece of media content, and displaying, in a second semantic region, a third icon representing the selected at least one second piece of media content adjacent to the first icon based on the ordered sequential relationship between the selected at least one second piece of media content and the viewed piece of media content.

18. The computer apparatus of claim 17, wherein the selecting the at least one second piece of media content comprises:

selecting at least one prior piece of media content occurring prior to the viewed piece of media content in the ordered sequential relationship; and selecting at least one subsequent piece of media content occurring subsequent to the viewed piece of media content in the ordered sequential relationship; and wherein the generating the two-dimensional visualization comprises arranging the identified at least one first piece of media content, the viewed piece of media content, the selected at least one prior piece of media content and the selected at least one subsequent piece of media content based on the ordered sequential relationship and content similarities.

19. The computer apparatus of claim 18, wherein the generating the two-dimensional visualization comprises applying the two-dimensional projection based layout.

20. The computer apparatus of claim 19, further comprising generating sub-sequence clusters between two or more pieces of media content selected from the plurality of other pieces of media content, the identified at least one first piece of media content, the viewed piece of media content, the selected at least one prior piece of media content and the selected at least one subsequent piece of media content, wherein the generating the sub-sequence clusters are generated based on both an ordered sequential relationship between the two or more pieces of media content and content similarity values of the two or more pieces of media content exceeding a threshold.

* * * * *